United States Patent [19]
Yamamoto et al.

[11] Patent Number: 5,572,575
[45] Date of Patent: Nov. 5, 1996

[54] CORDLESS TELEPHONE SYSTEM HAVING SPEAKER PHONE FUNCTION

[75] Inventors: Ikuhiro Yamamoto; Takashi Matsushiro, both of Kasuga, Japan

[73] Assignee: Matsushita Electric Industrial Co., Ltd., Japan

[21] Appl. No.: 406,391

[22] Filed: Mar. 20, 1995

[30] Foreign Application Priority Data

Mar. 24, 1994 [JP] Japan .................................. 6-053956

[51] Int. Cl.$^6$ .............................. H04Q 7/32; H04Q 7/30
[52] U.S. Cl. .............................. 379/61; 379/58; 379/420; 379/432
[58] Field of Search .................................. 379/58, 61, 67, 379/88, 388, 389, 420, 432

[56] References Cited

U.S. PATENT DOCUMENTS

| | | | |
|---|---|---|---|
| 4,640,987 | 2/1987 | Tsukada et al. | 379/61 |
| 5,073,928 | 12/1991 | Shimanuki | 379/61 |
| 5,220,594 | 6/1993 | Ohnishi et al. | 379/61 |

*Primary Examiner*—Dwayne D. Bost
*Attorney, Agent, or Firm*—Rossi & Associates

[57] ABSTRACT

A cordless telephone system comprises a base station, a handset unit, and a speaker phone circuit provided in the base station. In response to a request signal indicating that the handset unit uses the speaker phone circuit of the base station, the base station controls its communication path switching means (SW 33, 34) to connect its own speaker phone circuit (28) to a radio transmitting section (20) and a radio receiving section (18). Audio signals picked up by a microphone of the handset unit are transmitted to the speaker phone circuit (28), while audio signals of the speaker phone (28) are sent to a speaker of the handset unit. With this arrangement, a speaker phone communication is realized by the handset unit even if the handset unit has no speaker phone circuit.

7 Claims, 12 Drawing Sheets

CORDLESS TELEPHONE SYSTEM HAVING SPEAKER PHONE FUNCTION

BACKGROUND OF THE INVENTION

1. Field of the Invention

This invention relates to cordless telephone system having a speaker phone function.

2. Prior Art

Cordless telephone systems are generally constituted by a base station directly connected to the telephone line, and handset units which are wireless and portable and associated with the base station through two-way radio communication. Some of such cordless telephone systems provide the speaker phone function allowing users to enjoy conversation without using their hands. The speaker phone function is bidirectional in enabling the users to have a conversation with an opponent party without using their hands in both telephone transmission and reception. Thus, the speaker phone function is convenient when compared with a unidirectional on-hook dial function which only allows the users to rest their hands in a telephone reception mode.

A fundamental operation of conventional cordless telephone system, comprising a base station and an associated handset unit both having the speaker phone function, will be explained below.

When a user depresses a speaker phone button on the base station, a control unit of the base station operates its own speaker phone circuit to output audio signals received from the handset unit or the telephone line through a speaker not through the handset. On the contrary, in response to the user's voice, the base station causes its transmitting section to convert the received voice into audio signals and transmit them to the opponent party.

Meanwhile, when a user of the handset unit depresses a speaker phone button on the handset unit, the handset unit causes its control section to operate its own speaker phone circuit in the same manner as the base station.

However, according to the above-described conventional cordless telephone system, the speaker phone circuit must be installed in each of the base station and the handset unit. The speaker phone circuit is generally constructed by an analog IC (integrated circuit), whose size is fairly large, for example, 14×36 mm for 28 pins. Provision of such a large IC is not desirable for the handset unit, since the handset unit needs to reduce the weight and size to provide handiness in use. Furthermore, cost of such an analog IC is too expensive to provide it in each of the base station and handset units.

SUMMARY OF THE INVENTION

Accordingly, in view of above-described problems encountered in the prior art, a principal object of the present invention is to provide a cordless telephone system capable of realizing the speaker phone function by a handset unit even if the handset unit has no speaker phone circuit.

In order to accomplish this and other related objects, a first aspect of the present invention provides a cordless telephone system comprising: a base station connected to a telephone line for transmitting and receiving audio signals, the base station having a speaker phone circuit, a radio transmitting section and a radio receiving section; a handset unit having a radio transmitting section and a radio receiving section for executing radio communication with corresponding radio transmitting section and radio receiving section of the base station; the handset unit having request means for generating a request signal indicating that the handset unit uses the speaker phone circuit of the base station; the base station further comprising: a monitor speaker and a microphone for executing a speaker phone communication; and communication path switching means for switching communication path in response to the request signal generated by the request means, in such a manner that audio signals of the speaker phone circuit are sent from an audio signal output terminal of the speaker phone circuit to the radio transmitting section of the base station, while audio signals received by the radio receiving section of the base station are sent to an audio signal input terminal of the speaker phone circuit.

A second aspect of the present invention provides a cordless telephone system comprising a base station having a speaker phone circuit and a handset unit communicating with the base station by radio, the handset unit comprising: a radio transmitting section and a radio receiving section for executing radio communication with the base station; a monitor speaker and a microphone for executing a speaker phone communication; and request means for generating a request signal indicating that the handset unit uses the speaker phone circuit of the base station; the base station, connected to a telephone line for transmitting and receiving audio signals, comprising: a radio transmitting section and a radio receiving section for executing radio communication with corresponding radio transmitting section and radio receiving section of the handset unit; a monitor speaker, connected to an audio signal output terminal of the speaker phone circuit, for outputting voice in response to audio signals generated from the audio signal output terminal; a microphone, connected to an audio signal input terminal of the speaker phone circuit, for converting user's voice into audio signals and then transmitting the converted audio signals to the audio signal input terminal of the speaker phone circuit; communication path switching means for switching communication path; and speaker phone communication control means for controlling the communication path switching means in response to the request signal generated by the request means, in such a manner that audio signals of the speaker phone circuit are sent from an audio signal output terminal of the speaker phone circuit to the radio transmitting section of the base station, while audio signals received by the radio receiving section of the base station are sent to an audio signal input terminal of the speaker phone circuit.

A third aspect of the present invention provides a cordless telephone system comprising: a base station connected to a telephone line for transmitting and receiving audio signals, the base station having a speaker phone circuit, a radio transmitting section and a radio receiving section; a handset unit having a radio transmitting section and a radio receiving section for executing radio communication with corresponding radio transmitting section and radio receiving section of the base station; the handset unit having request means for generating a request signal indicating that the handset unit uses the speaker phone circuit of the base station; the base station further comprising: a monitor speaker, connected to an audio signal output terminal of the speaker phone circuit, for outputting voice in response to audio signals generated from the audio signal output terminal; a microphone, connected to an audio signal input terminal of the speaker phone circuit, for converting user's voice into audio signals and then transmitting the converted audio signals to the audio signal input terminal of the speaker phone circuit; communication path switching means for switching communication path; speaker phone communication control means for controlling the communication path switching means in response to the request signal generated by the request means, in such a manner that audio signals of the speaker phone circuit are sent from an audio signal output terminal of the speaker phone circuit to the radio transmitting section of the base station, while audio signals received by the radio receiving section of the base station are sent to an audio signal input terminal of the speaker phone circuit; and internal communication control means for controlling the communication path switching means, when the handset unit designates an internal communication to be executed between the base station and the handset unit, in such a manner that audio signals of the speaker phone circuit are sent from a telephone-line audio signal output terminal of the speaker phone circuit to the radio transmitting section of the base station, while audio signals received by the radio receiving section of the base station are sent to a telephone-line audio signal input terminal of the speaker phone circuit.

A fourth aspect of the present invention provides a cordless telephone system comprising: a base station connected to a telephone line for transmitting and receiving audio signals, the base station having a speaker phone circuit, a radio transmitting section and a radio receiving section; a handset unit having a radio transmitting section and a radio receiving section for executing radio communication with corresponding radio transmitting section and radio receiving section of the base station; the handset unit having request means for generating a request signal indicating that the handset unit uses the speaker phone circuit of the base station; the base station further comprising: a monitor speaker, connected to an audio signal output terminal of the speaker phone circuit, for outputting voice in response to audio signals generated from the audio signal output terminal; a microphone, connected to an audio signal input terminal of the speaker phone circuit, for converting user's voice into audio signals and then transmitting the converted audio signals to the audio signal input terminal of the speaker phone circuit; communication path switching means for switching communication path; speaker phone communication control means for controlling the communication path switching means in response to the request signal generated by the request means, in such a manner that audio signals of the speaker phone circuit are sent from an audio signal output terminal of the speaker phone circuit to the radio transmitting section of the base station, while audio signals received by the radio receiving section of the base station are sent to an audio signal input terminal of the speaker phone circuit; and three-way communication control means for controlling the communication path switching means, when the handset unit designates a three-way communication to be executed among the base station, the handset unit and an external party through the telephone line, in such a manner that audio signals of the speaker phone circuit are 'sent from a telephone-line audio signal output terminal of the speaker phone circuit to the radio transmitting section of the base station and to the telephone line, while audio signals received by the radio receiving section of the base station and audio signals sent from the telephone line are both sent to a telephone-line audio signal input terminal of the speaker phone circuit.

In the above cordless phone system, it is preferable that at least one of the base station and handset unit has recording means for recording audio signals received.

BRIEF DESCRIPTION OF THE DRAWINGS

The above and other objects, features and advantages the present invention will become more apparent from the following detailed description which is to be read conjunction with the accompanying drawings, in which.

DETAILED DESCRIPTION OF THE PREFERRED EMBODIMENT

A preferred embodiment of the present invention will be explained in greater detail hereinafter, with reference to the accompanying drawings. Identical parts are denoted by identical reference numeral throughout views. For simplified explanation, the cordless telephone system of this embodiment is constituted by a base station and a single handset unit. However, it is needless to say that a plurality of handset units can be associated with the base station.

Figure 1:
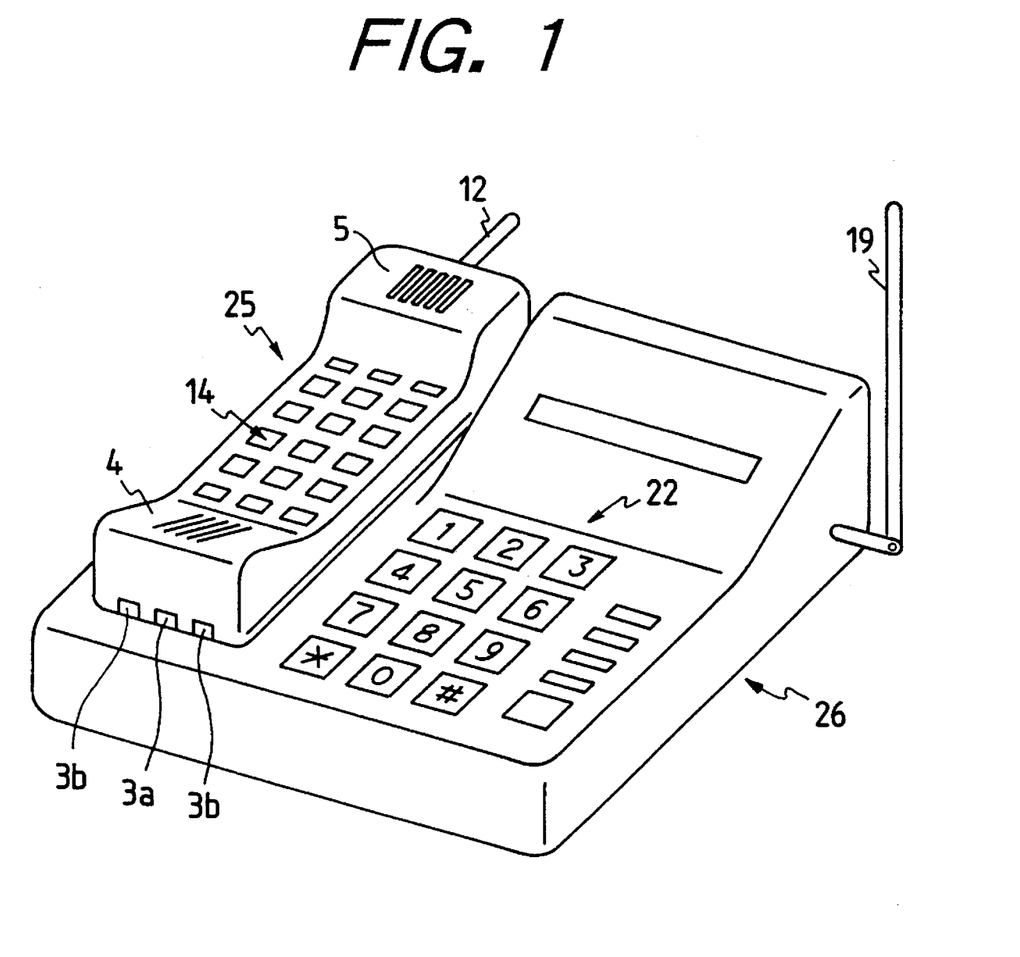
FIG. 1 is a perspective view schematically showing a cordless telephone in accordance with one embodiment of the present invention.
Figure 2:
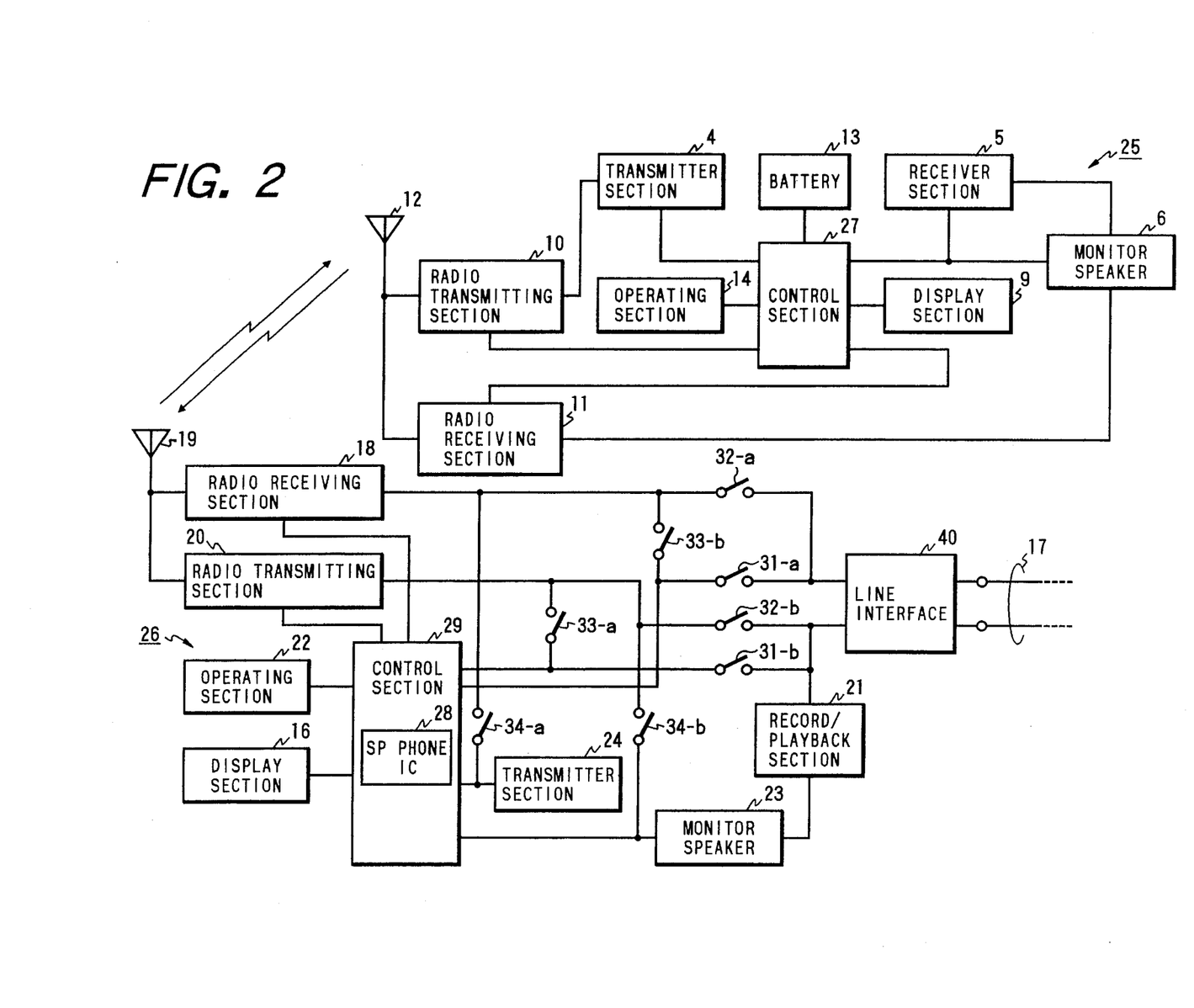
FIG. 2 is a block diagram showing a circuit arrangement of a cordless telephone system in accordance with one embodiment of the present invention.

FIG. 1 is a perspective view schematically showing a cordless telephone in accordance with one embodiment of the present invention. FIG. 2 is a block diagram showing a circuit arrangement of a cordless telephone system in accordance with one embodiment of the present invention. In FIGS. 1 and 2, the cordless telephone system includes a single handset unit 25 and a base station 26. The handset unit 25, being portable and wireless, can communicate with the base station 26 through two-way radio communication within a predetermined area (100–150 m). The handset unit 25 has a bottom (a front surface in FIG. 1) equipped with three terminals. A central terminal 3a is a control terminal, while right and left terminals are charging terminals 3b and 3b. This handset unit 25 is a so-called reversibly chargeable phone, which is always electrically conductible with corresponding three terminals of the base station 26 for charging operation even if the handset unit 25 is placed upside down on the base station In the handset unit 25, a reference numeral 4 represents a transmitter section which converts voice of users into audio signals, and a reference numeral 5 represents a receiver section which receives the audio signals and generates voice. A reference numeral 6 represents a monitor speaker which enlarges the volume of voice so that the voice can be listened from a far place. This monitor speaker 6 is used in ringing ring tones or in a speaker phone communication mode. The transmitter section 4 is constituted by an electronic condenser microphone or a dynamic microphone, while the receiver section 5 and the monitor speaker 6 are constituted by a speaker or the like.

A control section 27, managing overall control of the handset unit 25, comprises a CPU (central processing unit), ROM (read only memory), RAM (random access memory), PIO (parallel input/output) and others, to execute controls for telephone communications. The control section 27 also controls a display section 9 constituted by a liquid crystal or a light emitting diode or the like, to display an incoming call, or to indicate an operation mode such as an ordinary mode or an absence mode.

The control section 27 does not include a speaker phone circuit. Thus, the circuit arrangement of the control section 27 is simplified and the handset unit 25 itself becomes compact. In the speaker phone communication mode, the handset unit 25 uses the speaker phone circuit 28 of the base station 28. However, it is not possible to allow both the base station 28 and the handset unit 25 to simultaneously execute the speaker phone communication with the opponent party through the telephone line, A reference numeral 10 represents a radio transmitting section which converts the audio signals into radio waves for transmitting them, A reference numeral 11 represents a radio receiving section which receives the radio waves and then detects and demodulates them into the audio signals. A reference numeral 12 represents an antenna for transmitting and receiving communications between the handset unit 25 and the base station 26. The antenna 12 is usually a helical antenna for size reduction. A reference numeral 13 represents a battery acting as a power source. A reference numeral 14 represents an operating section for allowing dial input, manipulation of a speaker phone button, telephone mode settings for ordinary mode and absence mode, and others.

In the base station 26, a control section 29, managing overall control of the base station 26, comprises CPU, ROM, RAM, PIO, in addition to a speaker phone circuit 28 performing the speaker phone function. Thus, the control section 29 not only executes the controls for telephone operations and recording/playback operations but also controls a display section 16 constituted by a liquid crystal or a light emitting diode or the like, thereby displaying an incoming call or indicating an operation mode such as the ordinary mode or the absence mode.

Figure 3:
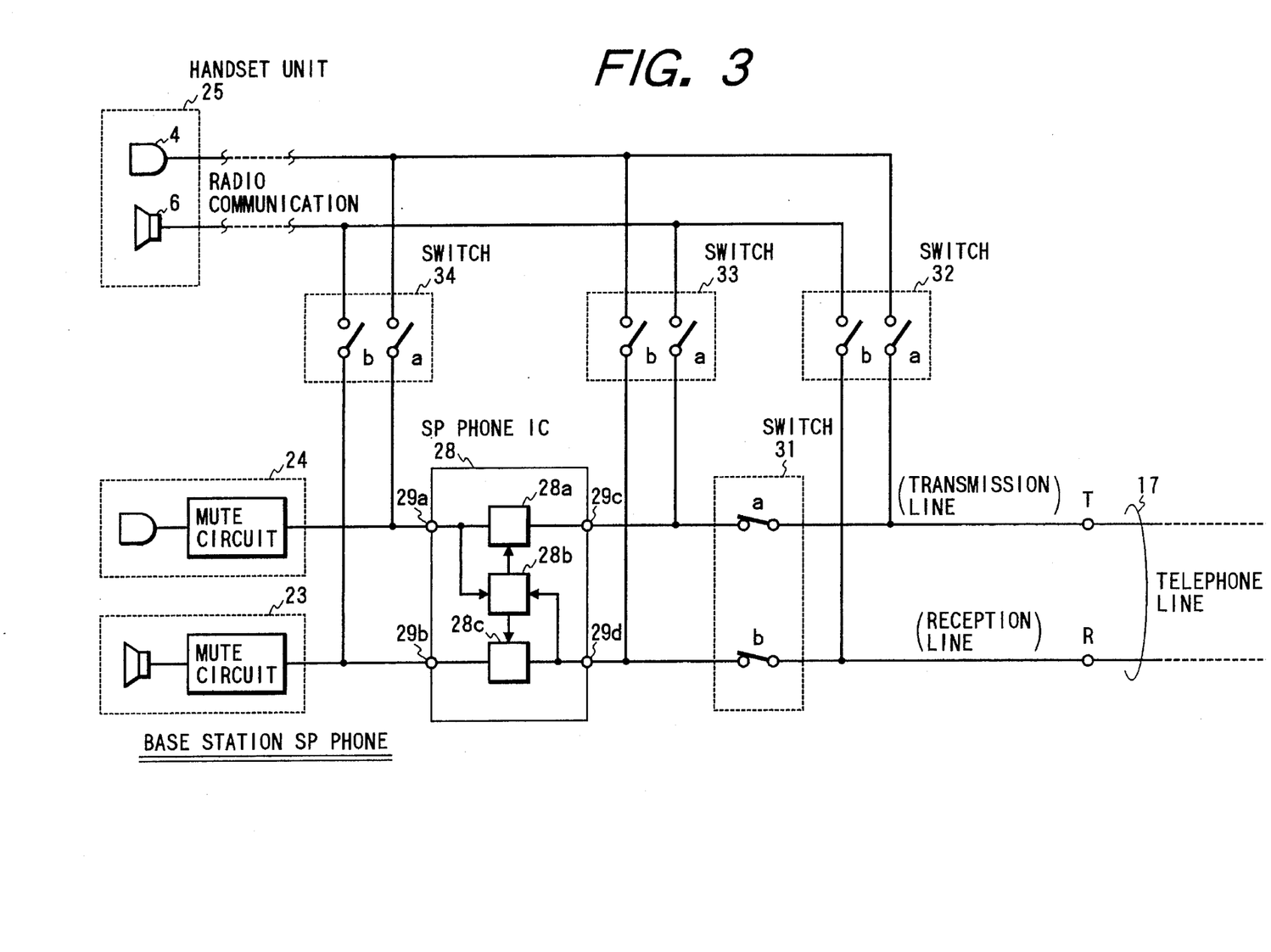
FIG. 3 is a block diagram showing detailed audio signal path of the base station in one speaker phone communication mode of the cordless telephone system in accordance with the present invention.

The speaker phone circuit 28 is constituted by an IC (integrated circuit), which is abbreviated "SP phone IC" in the drawing. As shown in FIG. 3, a reference numeral 29*a* represents an audio signal input terminal of the speaker phone circuit 28, which is connected to a transmitter section (microphone) 24 later described. A reference numeral 29*b* represents an audio signal output terminal of the speaker phone 28, which is connected to a monitor speaker 23 later described. A reference numeral 29*c* represents a telephone-line audio signal output terminal of the speaker phone circuit 28, which is connected to a transmission line of the telephone line 17. A reference numeral 29*d* represents a telephone-line audio signal input terminal of the speaker phone circuit 28, which is connected to a reception line of the telephone line 17.

A reference numeral 17 represents the telephone line. A reference numeral 18 represents a radio receiver section which receives radio waves through an antenna 19 and converts them into audio signals, thereafter transmits the converted signals to the telephone line 17. Like the above-described antenna 12, the antenna 19 can be constituted by a helical antenna. A reference numeral 20 represents a radio transmitting section, which converts the audio signals of the telephone line 17 into radio waves, and then transmits the radio waves to the handset unit 25 through the antenna 19.

This base station 26 includes an absence telephone function which automatically sends out a predetermined response message in response to an incoming-call when the absence mode is set, and records an incoming voice message (hereinafter abbreviated "ICM") from the opponent party. A reference numeral 21 represents a recording/playback section executing this absence telephone function. The recording/playback section 21 for example comprises an LSI (semiconductor integrated circuit) for executing recording and playback when the absence telephone mode is set, and a memory or a magnetic tape for memorizing the audio signals converted into digital form by the LSI.

A reference numeral 22 represents an operating section which allows manipulation of a speaker phone button, dial input, mode settings for ordinary mode and absence mode, and others. A reference numeral 23 represents a monitor speaker which enlarges the volume of voice so that the voice can be listened from a far place. A reference numeral 24 represents a transmitter section converts the voice of users into audio signals. For example, in the playback of ICM recorded in advance, the operating section 22 is first manipulated so as to set the playback mode. In response to this setting, the base station 26 causes the speaker of the monitor speaker 23 to generate the ICM recorded in the base station 26.

The audio signals from the audio signal output terminal 29*b* of the speaker phone circuit 28 are sent to the monitor speaker 23 in the base station, while the audio signals entered into the transmitter section 24 are transmitted to the audio signal input terminal 29*a* of the speaker phone circuit 28. In the speaker phone communication mode, voice is transmitted through the transmitter section 24 made of an electronic condenser microphone or a dynamic microphone, while audio signals received are enlarged in the monitor speaker 23 (which is hidden by the handset unit 25 in FIG. 1) and output therethrough. Both of the transmitter section (microphone) 24 and the monitor speaker 23 include a mute circuit for muting audio signals. Reference numerals S1, S2, S3 and S4 are switches for switching communication path to form a desired path in each communication mode. A reference numeral 40 represents a line interface section acting as an interface between the telephone line 17 and the base station 26.

Although the recording means is provided in the base station 26 only, it is also possible to provide an exclusive recording means in the handset unit 25.

Operations of the cordless telephone system according to one embodiment of the present invention constituted as described above will be explained with reference to the accompanying drawings; circuit block diagrams of FIGS.

3–5, 9 and 11 and flow charts shown in FIGS. 6–8, 10 and 12.

Operation pattern I

Figure 6:
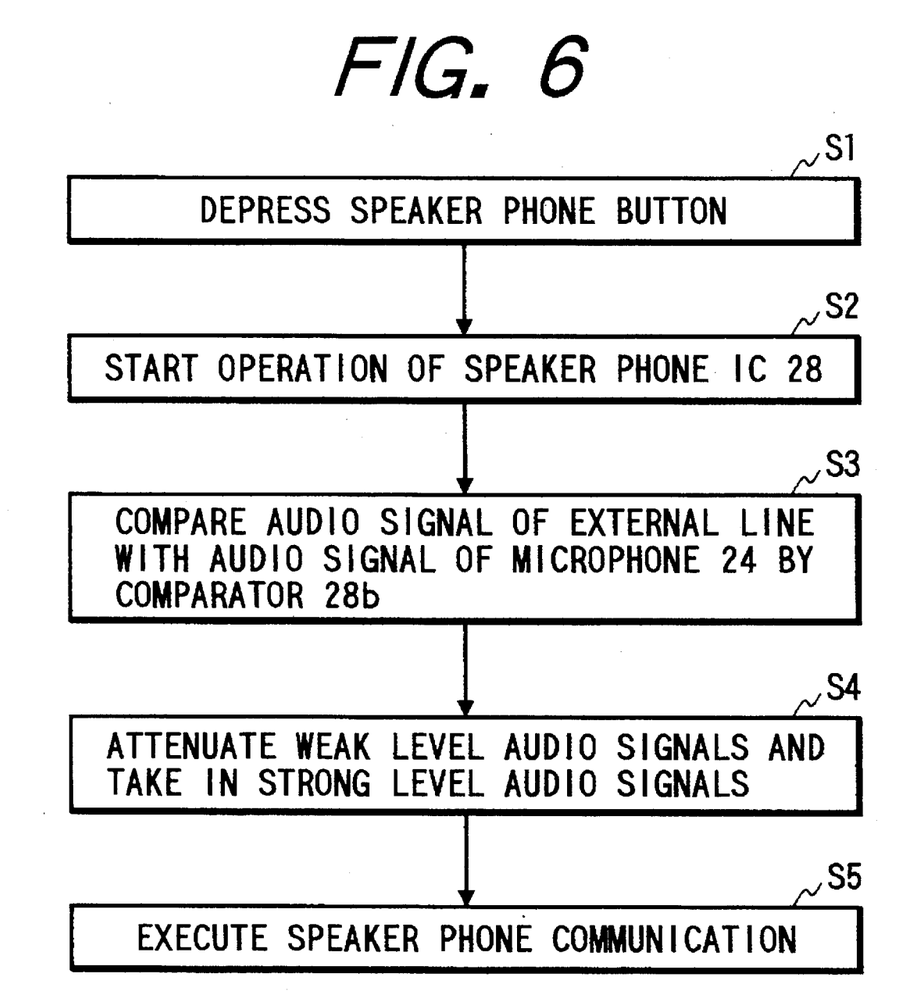
FIG. 6 is a flow chart showing an operation in the speaker phone communication mode of the cordless telephone system in accordance with the present invention.

A speaker phone communication, to be executed between the base station 26 and an external party through the telephone line 17, will be explained with reference to FIGS. 2, 3 and 6. In these cases, the handset unit 25 is not used. Thus, as shown in FIG. 3, only the switch 31 is turned on, all the remaining switches being turned off. The audio signals of the speaker phone circuit 28 are sent out through the telephone-line audio signal output terminal 29c to the telephone line 17. The audio signals of the telephone line 17 are entered into the speaker phone circuit 28 through the telephone-line audio signal input terminal 29d.

When the speaker phone button of the operating section 22 of the base station 26 is depressed (Step S1), the control section 29 starts operation of its own speaker phone circuit 28 (Step S2). Then, a comparator 28b of the speaker phone circuit 28 compares the audio signals sent from the telephone line 17 through the reception line thereof with the audio signals sent from the microphone (transmitter section) 24 of the base station 26 (Step S3). In this case, the audio signals sent from the microphone 24 will include voice output from the monitor speaker 23 and then picked up by the microphone 24 which will be weak level audio signals, and voice of the user directly entered into the microphone 24 which will be strong level audio signals. The weak level audio signals, detected by the comparator 28b, are largely decreased by an attenuator 28c to prevent the howling. On the other hand, the strong level audio signals are taken in. (Step S4)

For example, if the audio signals sent through the telephone line 17 are stronger in their level than those sent from the microphone 24, the monitor speaker 23 outputs such strong voice. The audio signals sent from the microphone 24, if stronger than those sent from the telephone line 17, are directly sent to the opponent party through the telephone line 17, thereby executing the speaker phone communication. (Step S5)

Operation pattern II

Figure 4:
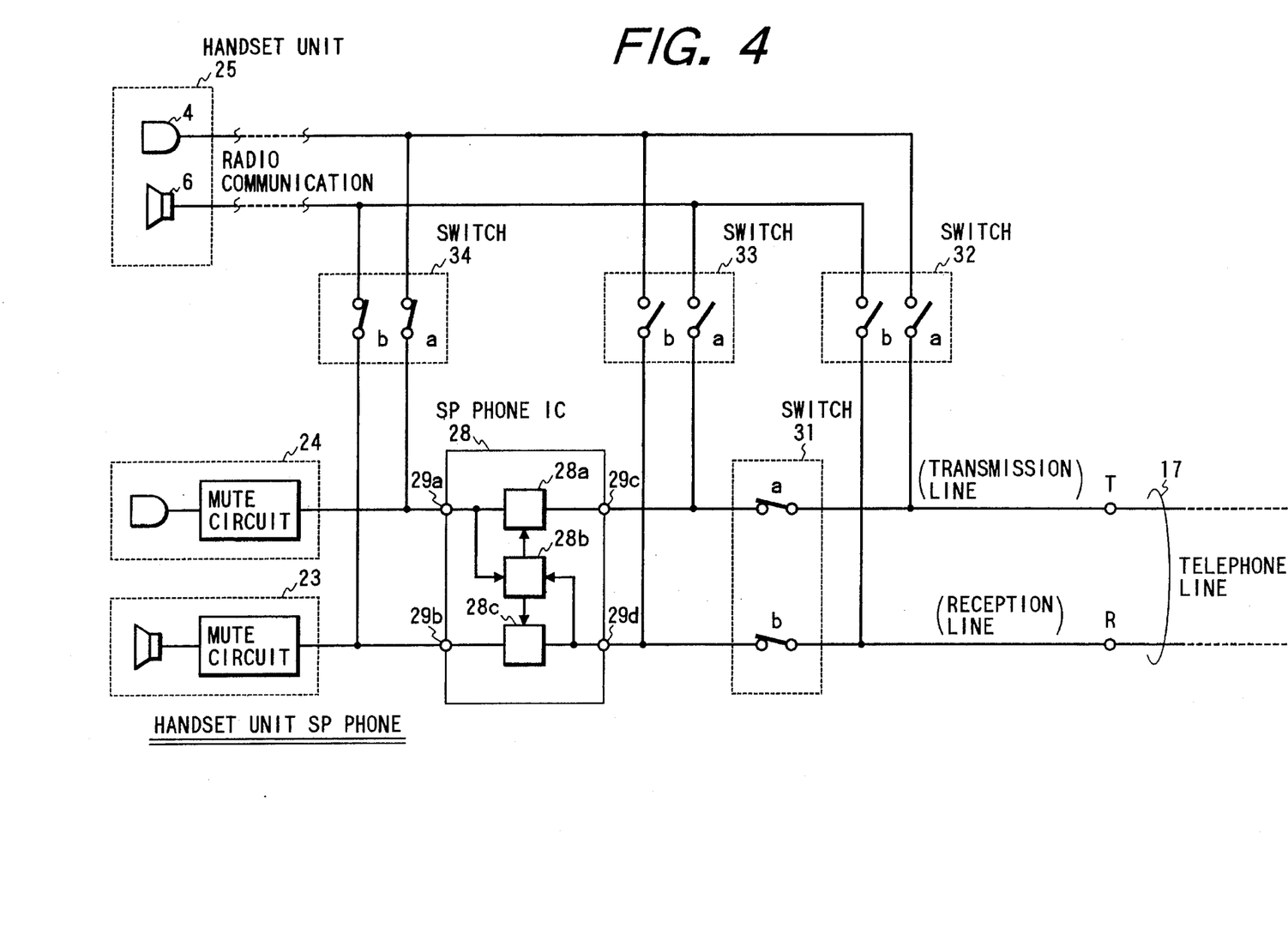
FIGS. 4 and 5 are block diagrams showing another detailed audio signal paths of the base station in another speaker phone communication modes of the cordless telephone system in accordance with the present invention.
Figure 7:
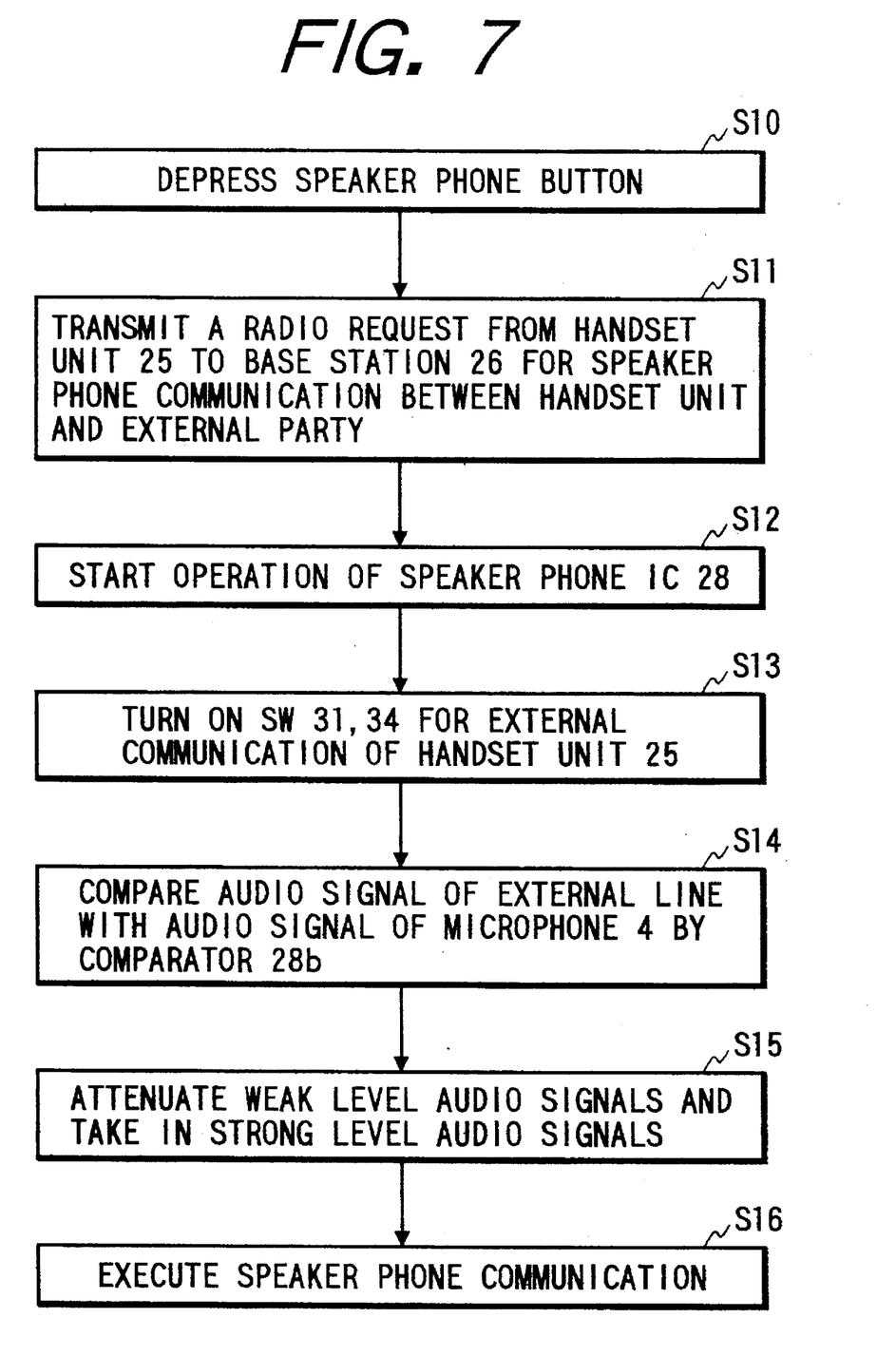
FIG. 7 is a flow chart showing another operation in the speaker phone communication mode of the cordless telephone system in accordance with the present invention.

Another speaker phone communication, to be executed between the handset unit 25 and an external party through the telephone line 17, will be explained with reference to FIGS. 2, 4 and 7. As the handset unit 25 does not have any speaker phone circuit for performing the speaker phone function as shown in FIG. 2, the speaker phone circuit 28 installed in the base station 26 is utilized in the speaker phone operation of the handset unit 25.

When the speaker button on the operating section 14 of the handset unit 25 is depressed (Step S10), the control section 27 of the handset unit 25 sends a request signal to the base station 26 by radio, the request signal indicating that the handset unit 25 is requesting the speaker phone communication with the external party. (Step S11)

When the base station 26 receives the request signal indicating that the handset unit 25 is requesting the speaker phone communication, the control section 29 of the base station 26 starts operation of its own speaker phone circuit 28 (Step S12), and turns on the switches S1 and S4 to route the handset unit 25 for external telephone line communication thorough the telephone line 17 (Step S13). By turning on the switch 34, the audio signals of the speaker phone circuit 28 are sent through the audio signal output terminal 29b to the radio transmitting section 18, while the audio signals received by the radio reception section 20 of the base station 26 are sent to the audio signal input terminal 29a of the speaker phone circuit 28. By turning on the switch 31, the audio signals are sent from the telephone-line audio signal output terminal 29c of the speaker phone circuit 28 to the telephone line 17, while the audio signals sent from the telephone line 17 are sent to the telephone-line audio signal input terminal 29d of the speaker phone circuit 28.

Both the mute circuits of the microphone 24 and the monitor speaker 23 are activated, so as to prevent any audio signals from being entered from the microphone 24 to the speaker phone circuit 28, and also to prevent any audio signals once output from the speaker phone circuit 28 from being entered from the monitor speaker 23. Then, the comparator 28b of the speaker phone circuit 28 compares the audio signals sent from the telephone line 17 through the reception line thereof with the audio signals sent from the microphone 4 of the handset unit 25 by radio (Step S14). In this case, the audio signals sent from the microphone 4 by radio will include voice output from the monitor speaker 8 and then picked up by the microphone 4 which will be weak level audio signals, and voice of the user directly entered into the microphone 4 which will be strong level audio signals. The weak level audio signals, detected by the comparator 28b, are largely decreased by the attenuator 28c to prevent the howling. On the other hand, the strong level audio signals are taken in. (Step S15)

For example, if the audio signals sent through the telephone line 17 are stronger in their level than those sent from the microphone 4 of the handset unit 25, the audio signals of the telephone line 17 are sent to the handset unit 25 and causes its monitor speaker 8 to output voice. On the other hand, the audio signals sent from the microphone 4, if stronger than those sent from the telephone line 17, are directly sent to the external party through the telephone line 17, thereby executing the speaker phone communication. (Step S16)

Operation pattern III

Figure 5:
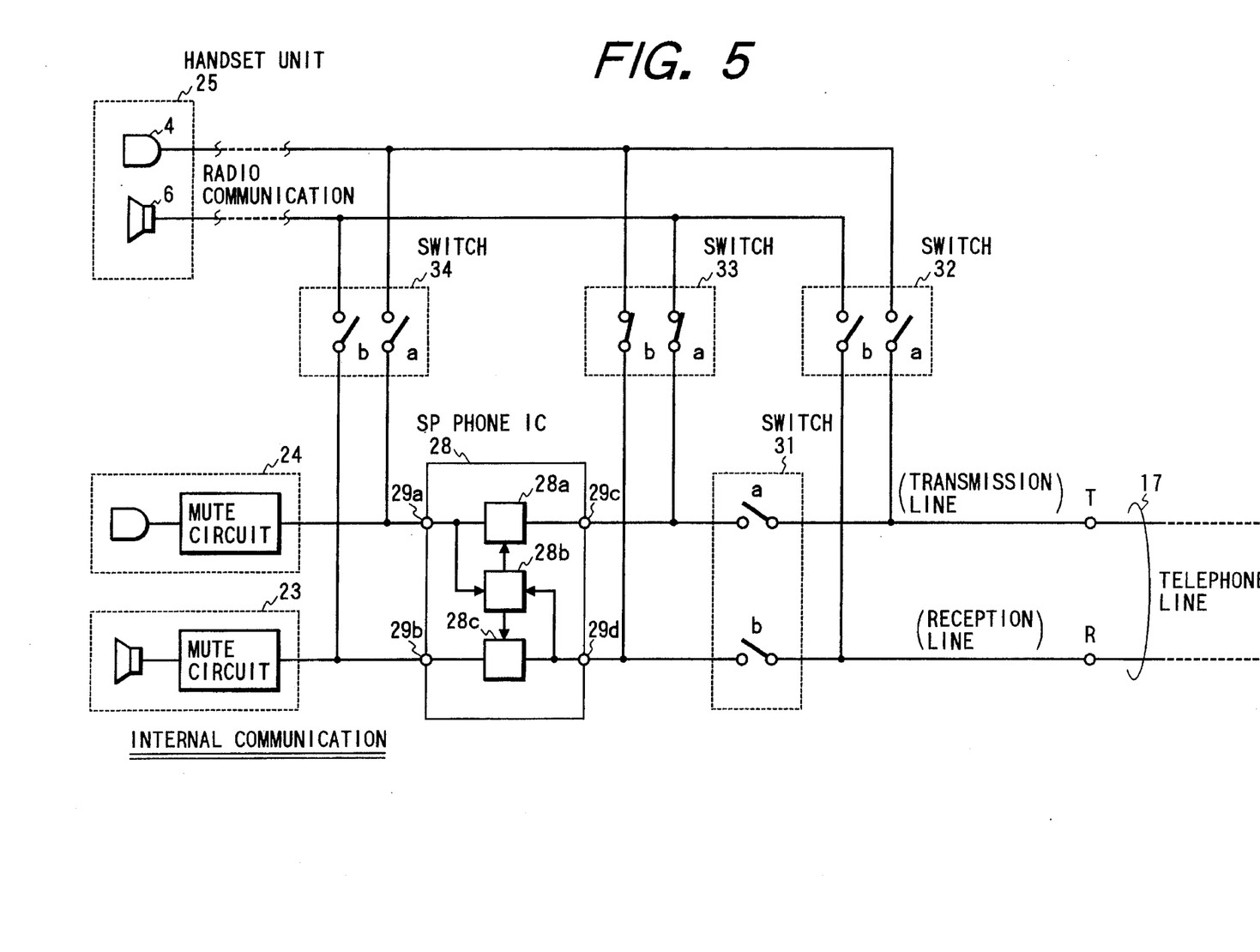
Figure 8:
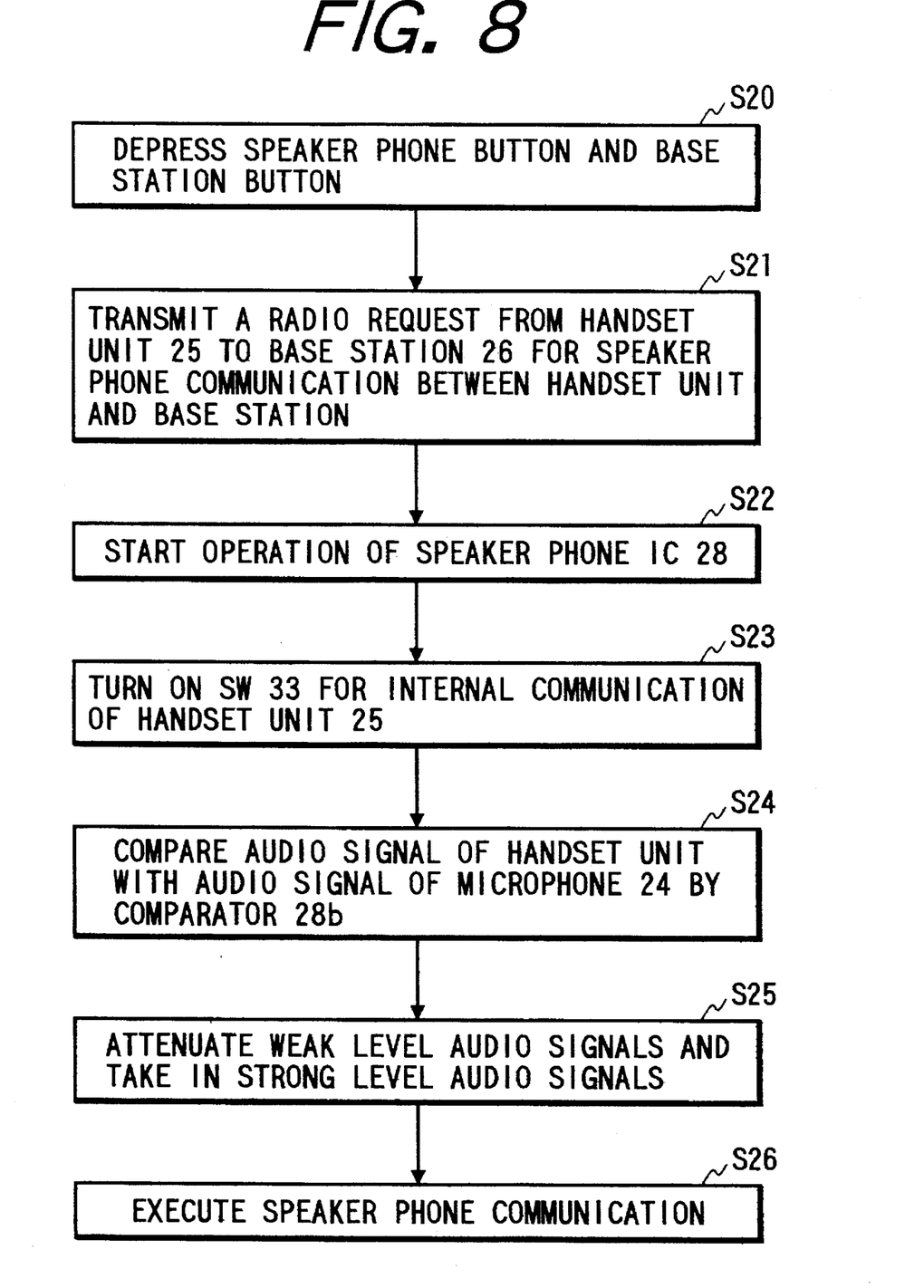
FIG. 8 is a flow chart showing still another operation in the speaker phone communication mode of the cordless telephone system in accordance with the present invention.

A speaker phone communication (internal line communication), to be executed between the base station 26 and the handset unit 25, will be explained with reference to FIGS. 2, 5 and 8.

When the speaker phone button and a base station button on the operating section 14 of the handset unit 25 are depressed (Step S20), the control section 27 of the handset unit 25 sends a request signal to the base station 26 by radio, the request signal indicating that the handset unit 25 is requesting the speaker phone communication to be executed between the base station 26 and the handset unit 25. (Step S21) When the base station 26 receives the signal indicating that the handset unit 25 is requesting the speaker phone communication with the base station 26, the control section 29 of the base station 26 starts operation of its own speaker phone circuit 28 (Step S22), and turns on the switch 33 to route the handset unit 25 for internal telephone line communication mode (Step S23). By turning on the switch 33, the audio signals of the speaker phone circuit 28 are sent through the telephone-line audio signal output terminal 29c to the radio transmitting section 18 in the base station 26, while the audio signals received by the radio reception section 20 of the base station 26 are sent to the telephone-line audio signal input terminal 29d of the speaker phone circuit 28.

Then, the comparator 28b of the speaker phone circuit 28 compares the audio signals sent from the handset unit 25 to the telephone reception line of the telephone line 17 with the audio signals sent from the microphone 24 of the base station 26 (Step S24). In this case, the audio signals sent from the microphone 24 will include voice output from the monitor speaker 23 and then picked up by the microphone 24 which will be weak level audio signals, and voice of the user using the handset unit 25 which will be strong level audio signals. The weak level audio signals, detected by the comparator 28b, are largely decreased by the attenuator 28c to prevent the howling. On the other hand, the strong level audio signals are taken in. (Step S25)

For example, if the audio signals sent from the microphone 4 of the handset unit 25 are stronger in their level than those sent from the microphone 24 of the base station 26, the monitor speaker 23 outputs such strong voice. On the contrary, the audio signals sent from the microphone 24 of the base station 26, if stronger than those sent from the microphone 4 of the handset unit 25, are sent to the handset unit 25 wherein the voice is generated through the monitor speaker 6, thereby executing the speaker phone communication. (Step S26)

Operation pattern IV

Figure 9:
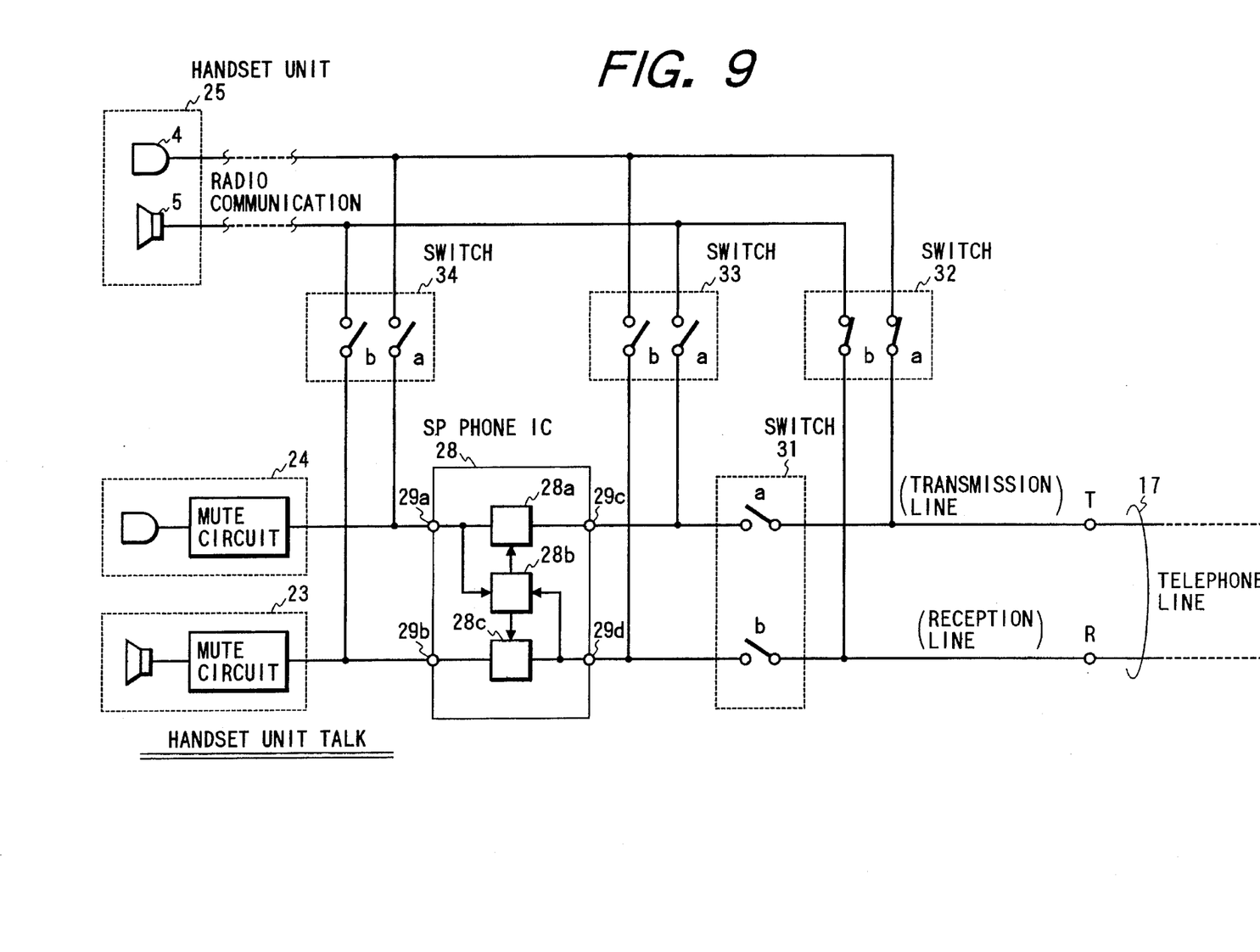
FIG. 9 is a block diagram showing detailed audio signal path of the base station in the ordinary communication mode of the cordless telephone system in accordance with the present invention.
Figure 10:
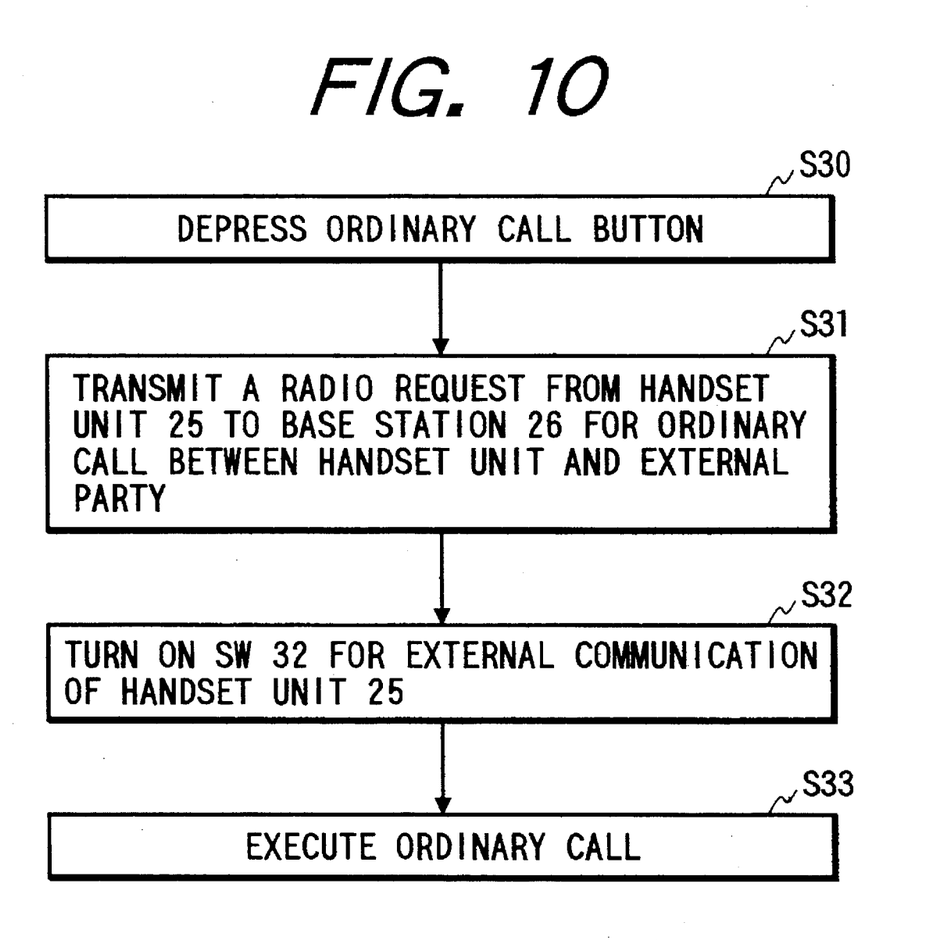
FIG. 10 is a flow chart showing an operation in the ordinary phone communication mode of the cordless telephone system in accordance with the present invention.

An ordinary communication without using the speaker phone function, to be executed between the handset unit 25 and an external party through the telephone line 17, will be explained with reference to FIGS. 2, 9 and 10.

When an ordinary call button on the operating section 14 of the handset unit 25 is depressed (Step S30), the control section 27 of the handset unit 25 sends a signal to the base station 26 by radio, the signal indicating that the handset unit 25 designates an ordinary call with external party through the telephone line 17 (Step S31). When the base station 26 receives the signal indicating that the handset unit 25 is requesting the ordinary call, the control section 29 of the base station 26 turns on the switch 32 to receive the audio signals of the telephone line 17 by the radio transmitting section 20 of the base station 26, and to send the audio signals from the radio receiving section 18 of the base station 26 to the telephone line 17. In this manner, the handset unit 25 is routed for external telephone line communication mode thorough the telephone line 17 (Step S32). Thus, the audio signals sent from the handset unit 25 are sent out to the external party through the telephone line 17, while the audio signals entered from the telephone line 17 are sent to the handset unit 25 via the radio transmitting section 20 and are output from the receiver section 5 of the handset unit 25, thereby executing an ordinary call (Step S33).

Operation pattern V

Figure 11:
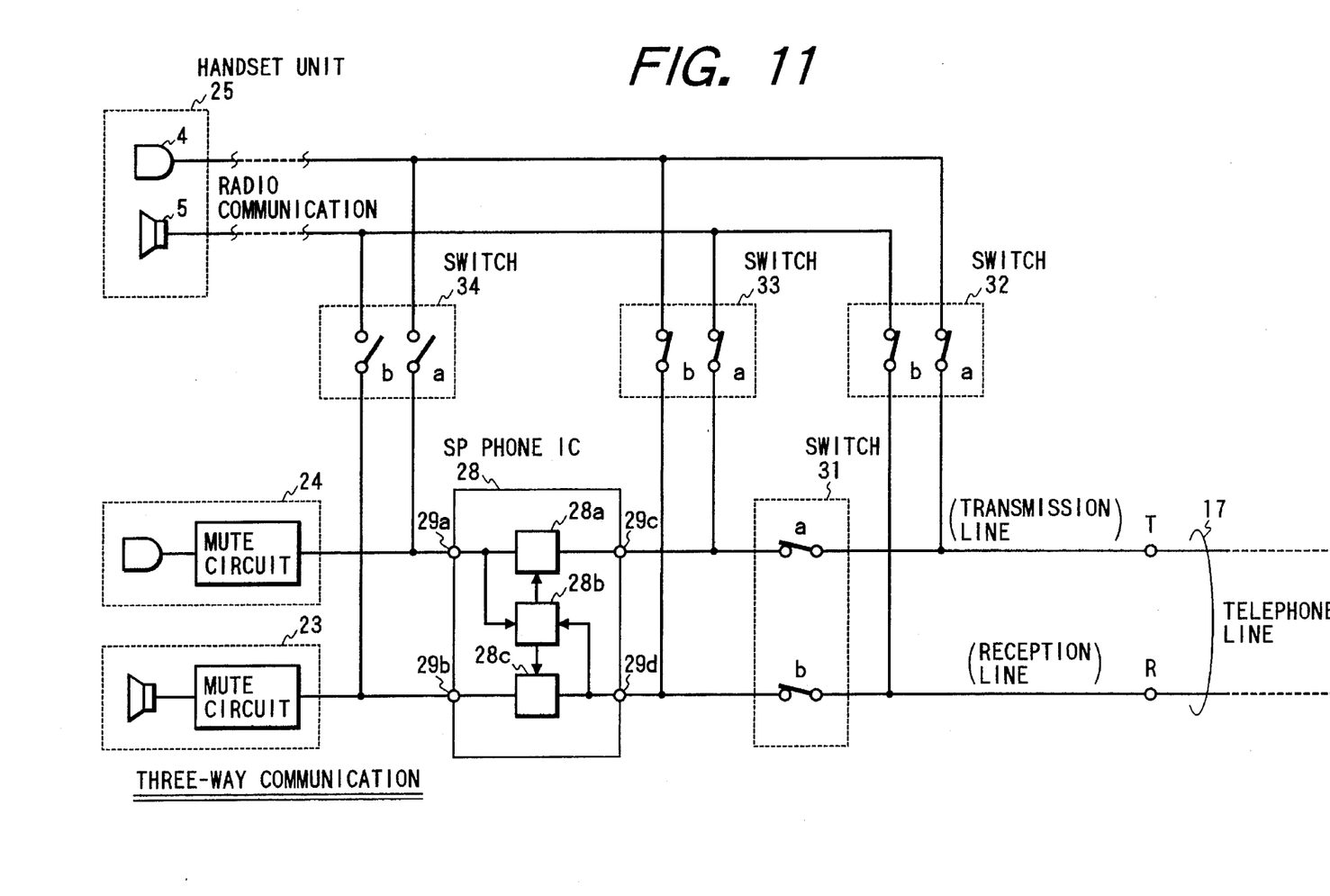
FIG. 11 is a block diagram showing still another detailed audio signal path of the base station in the three-way communication mode of the cordless telephone system in accordance with the present invention.
Figure 12:
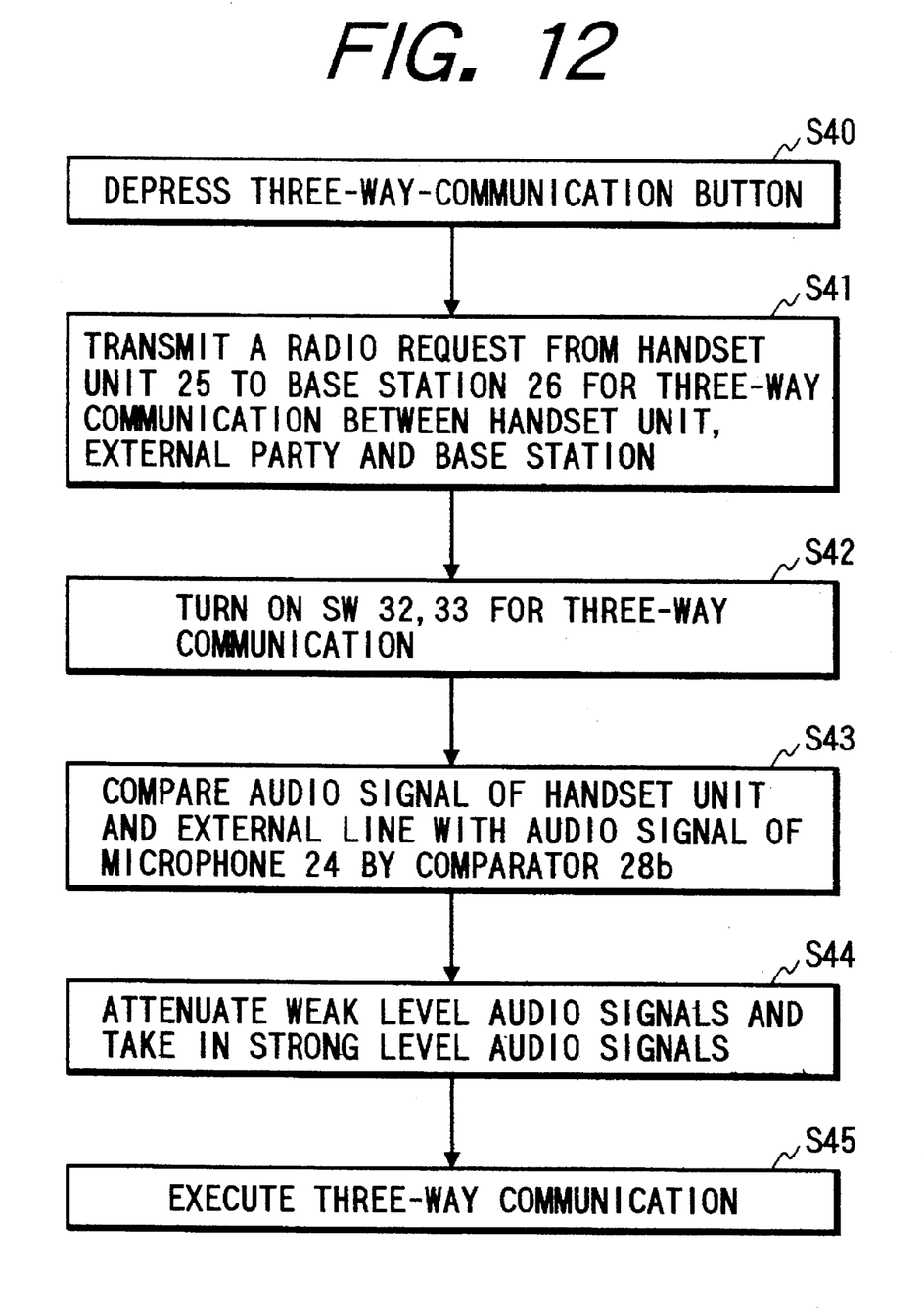
FIG. 12 is a flow chart showing yet another operation in the three-way communication mode of the cordless telephone system in accordance with the present invention.

A three-way communication, to be executed among the handset unit 25, the base station 26 and the external party when the base station 26 is engaged with the external party 20 through the telephone line 17, will be explained with reference to FIGS. 2, 11 and 12.

When a three-way communication button on the operating section 14 of the handset unit 25 is depressed (Step S40), the control section 27 of the handset unit 25 sends a signal to the base station 26 by radio, the signal indicating that the handset unit 25 designates the three-way communication mode (Step S41). When the base station 26 receives the signal indicating that the handset unit 25 is requesting the three-way communication, the control section 29 of the base station 26 turns on the switches 32 and 33, so as to form the audio signal path for three-way communication (Step S42).

The audio signals, output from the telephone-line audio signal output terminal 29c of the speaker phone circuit 28, are sent to the radio transmitting section 20 of the base station 26 and to the telephone line 17. The audio signals, sent from the radio receiving section of the base station 26 or the telephone line 17, are entered into the speaker phone circuit 28 through the telephone-line audio signal input terminal 29d. Since the base station 26 is in a speaker phone communication mode with the external party, the speaker phone circuit 28 and the switch S1 are on.

The audio signals, sent from the handset unit 25, are not only sent to the external-party through the telephone line 17 but entered into the speaker phone circuit 28. In this condition, if the audio signals are entered from the external party through the telephone line 17, such audio signals are also entered into the speaker phone circuit 28. The audio signals, received from the external party, are transmitted to the handset unit 25 through the radio transmitting section 20, and then the receiver section 5 of the handset unit 25 generates voice. Furthermore, the audio signals entered from the microphone 24 of the base station 26 are entered into the speaker phone circuit Then, the comparator 28b of the speaker phone circuit compares the audio signals sent from the microphone 4 of the handset unit 25 and the telephone line 17 with the audio signals sent from the microphone 24 of the base station (Step S43). In this case, the audio signals sent from the microphone 24 will include voice output from the monitor speaker 23 and then picked up by the microphone 24 which will be weak level audio signals, and voices of the user using the handset unit 25 which will be strong level audio signals. The weak level audio signals, detected by the comparator 28b, are largely decreased by the attenuator 28c to prevent the howling. On the other hand, the strong level audio signals are taken in (Step S44).

For example, if the audio signals sent from the microphone 4 of the handset unit 28 and the telephone line are stronger in their level than those sent from the microphone 24 of the base station 26, these stronger audio signals are output from the monitor speaker 23. On the other hand, the audio signals sent from the microphone 24 of the base station 26, if stronger than those sent from the microphone 4 of the handset unit 28 and the telephone line are not only sent to the handset unit 28 wherein the voice is generated from the receiver section 8 but sent to the external party through the telephone line 17, thereby executing the three-way communication. (Step S45)

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A cordless telephone system comprising:

a base station connected to a telephone line for transmitting and receiving audio signals, said base station having a speaker phone circuit, a radio transmitting section and a radio receiving section;

a handset unit having a radio transmitting section and a radio receiving section for executing radio communication with corresponding radio transmitting section and radio receiving section of said base station;

said handset unit having request means for generating a request signal indicating that said handset unit uses said speaker phone circuit of said base station;

said base station further comprising:

a monitor speaker and a microphone for executing a speaker phone communication; and communication path switching means for switching communication path in response to said request signal generated by said request means, in such a manner that audio signals of the speaker phone circuit are sent from an audio signal output terminal of the speaker phone circuit to said radio transmitting section of said base station, while audio signals received by said radio receiving section of the base station are sent to an audio signal input terminal of the speaker phone circuit wherein said communication path switching means enables a communication path to be established between the hand set unit and the telephone line via the speaker phone circuit of said base station.

2. The cordless phone system in accordance with claim 1, wherein at least one of said base station and handset unit has recording means for recording audio signals received.

3. A cordless telephone system comprising a base station having a speaker phone circuit and a handset unit communicating with said base station by radio, said handset unit comprising:

a radio transmitting section and a radio receiving section for executing radio communication with said base station;

a monitor speaker and a microphone for executing a speaker phone communication; and request means for generating a request signal indicating that said handset unit uses said speaker phone circuit of said base station;

said base station, connected to a telephone line for transmitting and receiving audio signals, comprising:

a radio transmitting section and a radio receiving section for executing radio communication with corresponding radio transmitting section and radio receiving section of said handset unit;

a monitor speaker, connected to an audio signal output terminal of said speaker phone circuit, for outputting voice in response to audio signals generated from said audio signal output terminal;

a microphone, connected to an audio signal input terminal of said speaker phone circuit, for converting user's voices into audio signals and then transmitting the converted audio signals to said audio signal input terminal of said speaker phone circuit;

communication path switching means for switching communication path; and speaker phone communication control means for controlling said communication path switching means in response to said request signal generated by said request means, in such a manner that audio signals of the speaker phone circuit are sent from an audio signal output terminal of the speaker phone circuit to said radio transmitting section of said base station, while audio signals received by said radio receiving section of the base station are sent to an audio signal input terminal of the speaker phone circuit wherein said communication path switching means enables a communication path to be established between the hand set unit and the telephone line via the speaker phone circuit of said base station.

4. The cordless phone system in accordance with claim 3, wherein at least one of said base station and handset unit has recording means for recording audio signals received.

5. A cordless telephone system comprising:

a base station connected to a telephone line for transmitting and receiving audio signals, said base station having a speaker phone circuit, a radio transmitting section and a radio receiving section;

a handset unit having a radio transmitting section and a radio receiving section for executing radio communication with corresponding radio transmitting section and radio receiving section of said base station;

said handset unit having request means for generating a request signal indicating that said handset unit uses said speaker phone circuit of said base station;

said base station further comprising:

a monitor speaker, connected to an audio signal output terminal of said speaker phone circuit, for outputting voice in response to audio signals generated from said audio signal output terminal;

a microphone, connected to an audio signal input terminal of said speaker phone circuit, for converting user's voices into audio signals and then transmitting the converted audio signals to said audio signal input terminal of said speaker phone circuit;

communication path switching means for switching communication path;

speaker phone communication control means for controlling said communication path switching means in response to said request signal generated by said request means, in such a manner that audio signals of the speaker phone circuit are sent from an audio signal output terminal of the speaker phone circuit to said radio transmitting section of said base station, while audio signals received by said radio receiving section of the base station are sent to an audio signal input terminal of the speaker phone circuit; and internal communication control means for controlling said communication path switching means, when said handset unit designates an internal communication to be executed between said base station and said handset unit, in such a manner that audio signals of the speaker phone circuit are sent from a telephone-line audio signal output terminal of the speaker phone circuit to said radio transmitting section of said base station, while audio signals received by said radio receiving section of the base station are sent to a telephone-line audio signal input terminal of the speaker phone circuit, said telephone-line audio signal input and output terminals being connected to the telephone line wherein said communication path switching means enables a communication path to be established between the hand set unit and the telephone line via the speaker phone circuit of said base station.

6. The cordless phone system in accordance with claim 5, wherein at least one of said base station and handset unit has recording means for recording audio signals received.

7. A cordless telephone system comprising:

a base station connected to a telephone line for transmitting and receiving audio signals, said base station having a speaker phone circuit, a radio transmitting section and a radio receiving section;

a handset unit having a radio transmitting section and a radio receiving section for executing radio communication with corresponding radio transmitting section and radio receiving section of said base station;

said handset unit having request means for generating a request signal indicating that said handset unit uses said speaker phone circuit of said base station;

said base station further comprising:

a monitor speaker, connected to an audio signal output terminal of said speaker phone circuit, for outputting voice in response to audio signals generated from said audio signal output terminal;

a microphone, connected to an audio signal input terminal of said speaker phone circuit, for converting user's voices into audio signals and then transmitting the converted audio signals to said audio signal input terminal of said speaker phone circuit;

communication path switching means for switching communication path;

speaker phone communication control means for controlling said communication path switching means in response to said request signal generated by said request means, in such a manner that audio signals of the speaker phone circuit are sent from an audio signal output terminal of the speaker phone circuit to said radio transmitting section of said base station, while audio signals received by said radio receiving section of the base station are sent to an audio signal input terminal of the speaker phone circuit; and three-way communication control means for controlling said communication path switching means, when said handset unit designates a three-way communication to be executed among said base station, said handset unit and an external party through said telephone line, in such a manner that audio signals of the speaker phone circuit are sent from a telephone-line audio signal output terminal of the speaker phone circuit to said radio transmitting section of said base station and to said telephone line, while audio signals received by said radio receiving section of the base station and audio signals sent from said telephone line are both sent to a telephone-line audio signal input terminal of the speaker phone circuit, said-telephone-line audio signal input and output terminals being connected to the telephone line wherein said communication path switching means enables a communication path to be established between the hand set unit and the telephone line via the speaker phone circuit of said base station.

* * * * *